United States Patent
Morgan et al.

(10) Patent No.: US 9,205,608 B2
(45) Date of Patent: Dec. 8, 2015

(54) CONTACT LENSES WITH IDENTIFYING MARK

(71) Applicant: Novartis AG, Basel (CH)

(72) Inventors: Courtney Flem Morgan, Alpharetta, GA (US); Sandra Corti, Suwanee, GA (US); Robert Carey Tucker, Suwanee, GA (US); Lance Kyle Lipscomb, Cumming, GA (US)

(73) Assignee: Novartis AG, Basel (CH)

( * ) Notice: Subject to any disclaimer, the term of this patent is extended or adjusted under 35 U.S.C. 154(b) by 423 days.

(21) Appl. No.: 13/726,269

(22) Filed: Dec. 24, 2012

(65) Prior Publication Data

US 2013/0168884 A1  Jul. 4, 2013

Related U.S. Application Data

(60) Provisional application No. 61/582,335, filed on Dec. 31, 2011.

(51) Int. Cl.
| | | |
|---|---|---|
| *B29D 11/00* | (2006.01) | |
| *B29C 37/00* | (2006.01) | |
| *B29C 35/08* | (2006.01) | |

(52) U.S. Cl.
CPC ...... *B29D 11/00317* (2013.01); *B29C 37/0032* (2013.01); *B29C 2035/0827* (2013.01); *B29C 2037/0046* (2013.01)

(58) Field of Classification Search
CPC .............. B29C 37/0032; B29D 11/00317; B29D 11/00
See application file for complete search history.

(56) References Cited

U.S. PATENT DOCUMENTS

| | | |
|---|---|---|
| 3,536,386 A | 10/1970 | Spivack |
| 4,017,407 A | 4/1977 | Cantor |
| 4,525,044 A | 6/1985 | Bauman |
| 4,536,554 A | 8/1985 | Lim |
| 4,582,402 A | 4/1986 | Knapp |
| 4,668,240 A | 5/1987 | Loshaek |
| 4,704,017 A | 11/1987 | Knapp |
| 4,857,072 A | 8/1989 | Narducy |
| 4,863,627 A | 9/1989 | Davies |
| 4,919,850 A | 4/1990 | Blum |
| 4,976,533 A | 12/1990 | Hahn |
| 4,983,702 A | 1/1991 | Mueller |
| 5,034,166 A | 7/1991 | Rawlings |
| 5,087,392 A | 2/1992 | Burke |
| 5,234,711 A | 8/1993 | Kamen |
| 5,272,010 A | 12/1993 | Quinn |
| 5,362,767 A | 11/1994 | Herbrechtsmeier |
| 5,391,589 A | 2/1995 | Kiguchi |
| 5,414,477 A | 5/1995 | Jahnke |
| 5,555,504 A | 9/1996 | Lepper |
| 5,597,519 A | 1/1997 | Martin |
| 5,598,233 A | 1/1997 | Haralambopoulos |
| 5,603,897 A | 2/1997 | Heiler |
| 5,605,667 A | 2/1997 | Powell, Jr. |
| 5,641,437 A | 6/1997 | Williams |
| 5,656,210 A | 8/1997 | Hill |
| 5,660,862 A | 8/1997 | Park |
| 5,681,510 A | 10/1997 | Valint, Jr. |
| 5,681,591 A | 10/1997 | Park |
| 5,699,900 A | 12/1997 | Artis |
| 5,760,100 A | 6/1998 | Nicolson |
| 5,894,002 A | 4/1999 | Boneberger |
| 5,936,704 A | 8/1999 | Gabrielian |
| 5,989,847 A | 11/1999 | Park |
| 6,024,448 A | 2/2000 | Wu |
| 6,038,997 A | 3/2000 | Madden |
| 6,042,230 A | 3/2000 | Neadle |
| 6,113,817 A | 9/2000 | Herbrechtsmeier |
| 6,465,954 B1 | 10/2002 | Kerslick |
| 6,491,393 B1 | 12/2002 | Appleton |
| 6,569,824 B2 | 5/2003 | Tsao |
| 6,616,946 B1 | 9/2003 | Meier |
| 6,737,661 B2 | 5/2004 | Kelly |
| 6,939,511 B2 | 9/2005 | Tsao |
| 7,550,519 B2 | 6/2009 | Phelan |
| 8,147,728 B2 | 4/2012 | Quinn |
| 2001/0013921 A1 | 8/2001 | Wu |
| 2002/0003605 A1 | 1/2002 | Rogers |
| 2002/0145211 A1 | 10/2002 | Pegram |
| 2003/0054109 A1 | 3/2003 | Quinn |
| 2003/0078171 A1 | 4/2003 | Tsao |
| 2003/0090014 A1 | 5/2003 | Heinrich |
| 2003/0163196 A1 | 8/2003 | Rothaug |
| 2003/0173717 A1 | 9/2003 | Abrams |
| 2004/0044099 A1 | 3/2004 | Tucker |
| 2004/0071591 A1 | 4/2004 | Tsao |
| 2004/0189931 A1 | 9/2004 | Dorsch |
| 2005/0007547 A1 | 1/2005 | Jones |

(Continued)

FOREIGN PATENT DOCUMENTS

| | | |
|---|---|---|
| EP | 0601857 A1 | 6/1994 |
| EP | 1078732 A2 | 2/2001 |

(Continued)

OTHER PUBLICATIONS

Written Opinion dated Apr. 2, 2013 in International Application Serial No. PCT/US2012/071567 filed Dec. 24, 2012.

(Continued)

*Primary Examiner* — Daniel McNally
(74) *Attorney, Agent, or Firm* — Sheng-Hsin Hu

(57) ABSTRACT

The present invention is related to a method for making contact lenses with identifying mark, in particular to silicone hydrogel contact lenses. The present invention is also related to a method of high intensity UV curing the identifying mark print on the mold and high intensity UV treating mold for making silicone hydrogel contact lenses with identifying mark.

14 Claims, No Drawings

(56) References Cited

U.S. PATENT DOCUMENTS

| | | | |
|---|---|---|---|
| 2005/0024583 A1 | 2/2005 | Neuberger | |
| 2005/0218536 A1 | 10/2005 | Quinn | |
| 2005/0219599 A1 | 10/2005 | White | |
| 2006/0126016 A1* | 6/2006 | Yokoyama et al. | 351/177 |
| 2007/0035050 A1* | 2/2007 | Rogers | 264/1.32 |
| 2008/0073804 A1 | 3/2008 | Matsuzawa | |
| 2008/0150178 A1* | 6/2008 | Aguado et al. | 264/1.38 |
| 2008/0217800 A1* | 9/2008 | Kernick et al. | 264/1.38 |
| 2009/0059166 A1 | 3/2009 | Suzuki | |
| 2009/0230575 A1* | 9/2009 | Liu et al. | 264/1.1 |
| 2011/0101552 A1 | 5/2011 | Cocora | |

FOREIGN PATENT DOCUMENTS

| | | |
|---|---|---|
| WO | 8605695 A1 | 10/1986 |
| WO | 9204922 A1 | 4/1992 |
| WO | 9611782 A1 | 4/1996 |
| WO | 2008081599 A1 | 7/2007 |
| WO | 2008079916 A2 | 7/2008 |

OTHER PUBLICATIONS

Search Report dated Apr. 2, 2013 in International Application Serial No. PCT/US2012/071567 filed Dec. 24, 2012.

* cited by examiner

CONTACT LENSES WITH IDENTIFYING MARK

This application claims the benefit under 35 USC §119 (e) of U.S. provisional application Ser. No. 61/582,335 filed Dec. 31, 2011, incorporated herein by reference in its entirety.

The present invention is related to a method for making contact lenses with clear or colored identifying mark, in particular to silicone hydrogel contact lenses. The present invention is also related to a method of high intensity UV curing the identifying mark print on the mold and high intensity UV treating mold for making silicone hydrogel contact lenses having high ion permeability.

BACKGROUND

Conventionally, a contact lens is provided with an identifying mark in the form of letters and figures, symbols, patterns, etc., principally for easy distinction, at a time of wearing, between the front and back surfaces of the lens or between lenses for the left and right eyes, and/or indicating the specifications and/or maker of the lens, for instance.

Various methods have been adopted for marking the ophthalmic lens with the above-mentioned letters, figures, symbols, and patterns. For example, there are known printing methods, in which marks are transferred on the lens surfaces, i.e., on the back surface (base curved surface) and/or the front surface (front curved surface), by using an ink, which is obtained by dissolving or dispersing a dyestuff such as a dye or a colorant in an organic medium. There are also known laser radiation marking methods, in which desired marks are printed or engraved by using a laser directly on the lens or on a mold and transferred to the lens.

However, with regard to the mark formed by the former printing method, there are anxieties that the dyestuffs of the mark may be flowed off, discolored, or peeled off due to various treatments repeatedly conducted on the lens, such as cleaning of the lens by rubbing and repetitive disinfection.

Meanwhile, the mark formed by the latter laser marking method is not easily readable. In addition, as the mark is made by forming grooves or recesses on the lens surface by the laser radiation, the thickness of the portions of the lens, which portions are subjected to the laser radiation, is inevitably reduced, or the lens material is ablated by the laser radiation. In either case, the mechanical strength of the ophthalmic lens is reduced.

Therefore, there are needs for a method for making silicone hydrogel contact lenses with identifying marks for the user, while still retaining an acceptable comfort level of the marked contact lenses and further providing other benefits for the user.

SUMMARY OF THE INVENTION

The present invention, in one aspect, provides a method of making silicone-hydrogel contact lenses, comprising the steps of:
  (a) providing a mold assembly comprising a female mold half having a molding surface and a male mold half having a molding surface;
  (b) applying at least one identifying mark coat to at least a portion of at least one of the female molding surface and the male molding surface with an ink, wherein the ink comprises a silicone-containing polymer binder;
  (c) irradiating the identifying mark coat on the molding surface with a first high intensity UV light to at least partially cure the identifying mark coat;
  (d) irradiating the exposed surfaces of the female mold and the male mold with a second high intensity UV light prior to;
  (e) filling a lens-forming fluid material comprising at least one silicone-containing vinylic monomer or macromer and at least one hydrophilic vinylic monomer into the irradiated mold assembly from step d);
  (f) exposing the mold assembly and the lens-forming fluid material to an energy source, wherein the energy source polymerizes the lens-forming fluid material;
  wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as common within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. Typically, a contact lens has an anterior surface and an opposite posterior surface and a circumferential edge where the anterior and posterior surfaces are tapered off.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

An "identifying mark" refers to not only the marks to help the inspectors determine the lens lot (typically an alphanumeric code but also marks describe if the lens is inverted, or the lens is centered and stable (such as for toric lens), or whether the lens is needed replacement or not.

A "colored identifying mark" refers to an identifying mark is a color image printed contact lens.

A "clear identifying mark" refers to an identifying mark is a clear image printed on contact lens with clear ink. The clear ink does not contain pigment or dyes but clear identifying mark becomes visible under certain lighting conditions such as slit lamp. A "clear identifying mark" also can refer to an identifying mark is a clear image printed on contact lens the invisible transparent (clear) Fluorescent paints. Alternatively, the clear identifying mark can refer to a formulation with a different refractive index than the contact lens.

A "slit lamp" is an instrument consisting of a high-intensity light source that can be focused to shine a thin sheet of light into the eye. It is used in conjunction with a biomicroscope. The lamp facilitates an examination of the anterior segment, or frontal structures and posterior segment, of the human eye, which includes the eyelid, sclera, conjunctiva, iris, natural crystalline lens, and cornea. The binocular slit-lamp examination provides a stereoscopic magnified view of the eye structures in detail, enabling anatomical diagnoses to be made for a variety of eye conditions. A second, hand-held lens is used to examine the retina.

A "colored coat" refers to a coating on an object and having a color image printed therein.

A "colorant" means either a dye or a pigment or a mixture thereof that is used to print a color image on an article.

"Dye" means a substance that is soluble in a solvent and that is used to impart color. Dyes are typically semi-transparent and absorb but do not scatter light. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

"Fluorescence" means luminescence caused by absorption of visible light or ultraviolet radiation at one wavelength followed by nearly immediate emission at a longer wavelength. Fluorescent emission ceases almost immediately when the light or incident ultraviolet radiation stops.

"Phosphorescence" is luminescence caused by the absorption of radiation at one wavelength followed by delayed emission at a different wavelength. Phosphorescent emission continues for a prolonged time after the incident radiation stops.

A "pigment" means a powdered substance that is suspended in a liquid in which it is insoluble. Pigments are used to impart color. Pigments, in general, are more opaque than dyes.

The term "a pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment be heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom D M Handbook of U.S. Colorants for a list of colorants that may be used with the present invention. A more preferred embodiment of a non-pearlescent pigment include (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154, for violet, carbazole violet; for black, Monolith black C-K (CIBA Specialty Chemicals).

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

A "lens-forming material" refers to a polymerizable composition (or formulation) which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

A "hydrophilic vinylic monomer", as used herein, refers to a vinylic monomer which is capable of forming a homopolymer that can absorb at least 10 percent by weight water when fully hydrated.

A "hydrophobic vinylic monomer", as used herein, refers to a vinylic monomer which is capable of forming a homopolymer that can absorb less than 10 percent by weight water when fully hydrated.

A "macromer" refers to a medium to high molecular weight compound or polymer that contains functional groups capable of undergoing further polymerization/crosslinking reactions. Medium and high molecular weight typically means average molecular weights greater than 700 Daltons.

Preferably, a macromer contains ethylenically unsaturated groups and can be polymerized actinically or thermally.

"Molecular weight" of a polymeric material (including monomeric or macromeric materials), as used herein, refers to the number-average molecular weight unless otherwise specifically noted or unless testing conditions indicate otherwise.

A "polymer" means a material formed by polymerizing/crosslinking one or more monomers, macromers and or oligomers.

"A binder polymer" refers to a crosslinkable polymer that can be crosslinked by a crosslinker or upon initiation by a chemical or physical means (e.g., moisture, heating, UV irradiation or the like) to trap or bind colorants onto or into a medical device (preferably a contact lens) such as that term is known in the art.

A "photoinitiator" refers to a chemical that initiates radical crosslinking and/or polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 4265, and Irgacure® 2959. Azo type initiators [e.g. 2,2'-azobis(2,4-dimethylpentanenitrile), 2,2'-azobis(2-methylpropanenitrile), 2,2'-azobis(2-methylbutanenitrile)] can be use as photo or thermal initiators.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronitrile (AIBN).

The term "fluid" as used herein indicates that a material is capable of flowing like a liquid.

An "interpenetrating polymer network (IPN)" as used herein refers broadly to an intimate network of two or more polymers at least one of which is either synthesized and/or crosslinked in the presence of the other(s). Techniques for preparing IPN are known to one skilled in the art. For a general procedure, see U.S. Pat. Nos. 4,536,554, 4,983,702, 5,087,392, and 5,656,210, the contents of which are all incorporated herein by reference. The polymerization is generally carried out at temperatures ranging from about room temperature to about 145° C.

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 \text{ oxygen})/(cm^2)(sec)(mm^2 \text{ Hg})] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 \text{ oxygen})(mm)/(cm^2)(sec)(mm^2 \text{ Hg})] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 micrometers (0.090 mm) would have a Dk/t of 100 barrers/mm (oxygen transmissibility barrers/mm).

The "ion permeability" through a lens correlates with the Ionoflux Diffusion Coefficient. The Ionoflux Diffusion Coefficient, D, is determined by applying Fick's law as follows:

$$D = -n'/(A \cdot dc/dx)$$

where n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

The term "molding surface with optical quality" in reference to molding surface defines one of the posterior and anterior surfaces of a contact lens. After demolding from the mold, the contact lens has an optically finished surfaces corresponding to one of the anterior and posterior surfaces of a contact lens. The term "optically finished" in reference to a surface or a zone in a surface refers to a surface of a contact lens or a zone in a surface of a contact lens, wherein the surface or zone does not need to undergo further processing, e.g., such as, polishing or lathing.

The present invention is generally directed to a method of making silicone-hydrogel contact lenses, comprising the steps of:
  (a) providing a mold assembly comprising a female mold half having a molding surface and a male mold half having a molding surface;
  (b) applying at least one identifying mark coat to at least a portion of at least one of the female molding surface and the male molding surface with an ink, wherein the ink comprises a silicone-containing polymer binder;
  (c) irradiating the identifying mark coat on the molding surface with a first high intensity UV light to at least partially cure the identifying mark coat;
  (d) irradiating the exposed surfaces of the female mold and the male mold with a second high intensity UV light prior to;
  (e) filling a lens-forming fluid material comprising at least one silicone-containing vinylic monomer or macromer and at least one hydrophilic vinylic monomer into the irradiated mold assembly from step d);
  (f) exposing the mold assembly and the lens-forming fluid material to an energy source, wherein the energy source polymerizes the lens-forming fluid material;
  wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

In accordance with the invention, the ink comprises a silicone-containing binder polymer.

A solvent can be water, an organic or inorganic solvent, a mixture of several organic solvents, or a mixture of water and one or more water soluble or water miscible organic solvents.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together. As defined herein, "primary colors" mean cyan, yellow, magenta, white, and black. A colorant may also be a mixture of at least one pigment and at least one dye. A person skill in the art will know how to select colorants.

In accordance with the invention, a silicone-containing binder polymer should comprise crosslinkable groups selected from the group consisting of ethylenically unsaturated groups, hydroxyl —OH, amino —NHR (wherein R is hydrogen or $C_1$ to $C_8$ alkyl), carboxylic acid —COOH, epoxy, amide —CONHR, isocyanate, peroxy, perester, anhydride, alkoxysilane, silanol, acetoxysilane, silanes, halosilane, and combinations thereof. The identifying mark coat may or may not contain an adhesion promoter, largely depending on the type of crosslinkable groups of a silicone-containing binder polymer to be used.

Where the silicone-containing bind polymer in an ink comprises ethylenically unsaturated groups as crosslinkable groups, a colored coat printed on the molding surface of a mold can be cured actinically to form a colored film. There is no need for an adhesion promoter. Examples of such silicone-containing binder polymer are ethylenically functionalized derivatives of silicon-containing polymers, as disclosed in commonly assigned U.S. Patent Application No. 60/564,024 filed Apr. 21, 2004 (herein incorporated by reference in its entirety). The term "ethylenically functionalized" as used herein is intended to describe the introduction of ethylenically unsaturated groups into the silicone-containing polymer. The silicone-containing polymer to be ethylenically functionalized is preferably a copolymerization product of a polymerizable composition, which comprises (a) at least one hydrophilic vinylic monomer, (b) at least one functionalizing vinylic monomer containing at least one pendant functional groups, preferably selected from the group consisting of hydroxyl groups (—OH), primary amino groups (—$NH_2$), secondary amino groups (—NHR), carboxylic groups (—COOH), epoxy groups, aldehyde groups (—CHO), amide groups (—$CONH_2$), acid halide groups (—COX, X=Cl, Br, or I), isothiocyanate groups, isocyanate groups, halide groups (—X, X=Cl, Br, or I), acid anhydride groups, and combinations thereof, and (c) at least one silicone-containing vinylic monomer or macromer. The polymerizable composition can also include a polymerization initiator (i.e., a photoinitiator or a thermal initiator), a solvent which is preferably the solvent used in an ink, and a chain transfer agent. Ethylenically functionalizing of the silicone-containing polymer is carried out by reacting the silicon-containing polymer with an ethylenically functionalizing agent which comprises an ethylencially unsaturated group and a group capable of reacting with the functional groups of the silicone-containing polymer to form covalent linkages, as known to person skilled in the art. Examples of preferred ethylenically functionalizing agents include, but are not limited to, glycidylmethacrylate, glycidylacrylate, 2-isocyanatoethylmethacrylate (IEM), N-hydroxymethylacrylamide (NHMA), acryloylchloride, methacrylolylchloride, methacrylic acid, acrylic acid, 2-bromoethylmethacrylate, and methacrylic anhydride.

Where a silicone-containing binder polymer in an ink coat comprises crosslinkable groups selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof, it is preferably that an adhesion promoter is included in the identifying mark coat. Examples of such silicone-containing binder polymer are those disclosed in a commonly-assigned as disclosed in commonly assigned U.S. Pat. No. 8,147,728 (herein incorporated by reference in its entirety). Such silicone-containing binder polymer can be a copolymerization product of a polymerizable mixture including: (i) at least one hydrophilic vinylic monomer; (ii) at least one functionalizing vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof; and (iii) at least one silicone-containing vinylic monomer or macromer one or more components selected from the group consisting of a polymerization initiator (i.e., a photoinitiator or a thermal initiator), a chain transfer agent, and a solvent. The polymerizable mixture can also include a polymerization initiator (i.e., a photoinitiator or a thermal initiator), a solvent which is preferably the solvent used in an ink, and a chain transfer agent. The polymerizable mixture can optionally include a hydrophobic vinylic monomer, for example, such as, 2-ethoxyethylmethacrylate (EOEMA).

Examples of siloxane-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any know suitable siloxane-containing macromer can be used. A particularly preferred siloxane-containing macromer is selected from the group consisting of Macromer A, Macromer B, Macromer C, and Macromer D described in U.S. Pat. No. 5,760,100, herein incorporated by reference in its entirety.

Nearly any hydrophilic vinylic monomer can be used in the invention. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quaternary ammonium), mono(lower alkylamino)(lower alkyl) and di(lower alkylamino)(lower alkyl)acrylates and methacrylates, allyl alcohol and the like. Among the preferred hydrophilic vinylic monomers are N,N-dimethylacrylamide (DMA), 2-hydroxyethylmethacrylate (HEMA), hydroxyethyl acrylate (HEA), hydroxypropyl acrylate, hydroxypropyl methacrylate (HPMA), trimethylammonium 2-hydroxy propylmethacrylate hydrochloride, dimethylaminoethyl methacrylate (DMAEMA), glycerol methacrylate (GMA), N-vinyl-2-pyrrolidone (NVP), dimethylaminoethylmethacrylamide, acrylamide, methacrylamide, allyl alcohol, vinylpyridine, N-(1,1dimethyl-3-oxobutyl)acrylamide, acrylic acid, and methacrylic acid.

Any known suitable vinylic monomer containing at least one functional group selected from the group consisting of hydroxyl group —OH, amino group —NHR (wherein R is hydrogen or $C_1$ to $C_8$ alkyl), carboxylic group —COOH, epoxy group, amide group —CONHR, and combinations thereof can be used as functionalizing vinylic monomer in the present invention. Preferred examples of such vinylic monomers includes methacrylic acid (MAA), acrylic acid, glycidylmethacrylate, glycidylacrylate, HEMA, HEA, and N-hydroxymethylacrylamide (NHMA).

It should be understood that a vinylic monomer can be used both as a hydrophilic vinylic monomer and as a functionalizing vinylic monomer in the polymerizable composition for preparing the silicone-containing polymer with pendant functional groups. Preferably, the hydrophilic vinylic monomer is devoid of groups that could participate in crosslinking (e.g., DMA, NVP).

Any known suitable chain transfer agent can be used in the present invention. Examples of preferred chain transfer agent includes mercaptoethane, mercaptoethanol, ethanedithiol, propanedithiol, and mercapto-terminated polydimethylsiloxane.

In accordance with the invention, copolymerization reaction for preparing a binder polymer can be initiated by heat or actinic radiation (e.g., UV) in a polymerizable mixture which includes a solvent (e.g, ethanol or cyclopentanone), a thermal initiator (e.g., AIBN) or a photoinitiator, a chain transfer agent (e.g., ethyl mercaptan (EtSH)), a hydrophilic vinylic monomer devoid of functional groups (e.g. DMA), a functionalizing vinylic monomer having at least one functional groups (e.g. HEMA, MAA, or glycidylmethacrylate), an alkoxysilane monomer (e.g. TRIS), and monomethacrylated polydimethylsiloxane. It might be preferable the polymerization reaction is not complete, thereby producing a binder polymer dissolved in a solvent which preferably contains some residual unreacted vinylic monomers. Polymerization mixtures that contain only binder and unconverted monomer might also be desirable since solvent would be eliminated. The unconverted monomer can be used to help control rheological properties of inks and be converted to polymer during ink cure and/or lens curing. A person skilled in the art will know well how to control polymerization level.

In accordance with the invention, an ink can also comprise one or more components selected from the group consisting of a thermal initiator, a photoinitiator, a dliluent, a surfactant, a humectant, an antimicrobial agent, an antioxidant agent, an anti-coagulating agent, and other additives known in the art.

In accordance with the invention, a diluent can be a solvent or a solution of one or more vinylic monomers.

An ink used in the invention should have a good adhesion to a silicone hydrogel contact lens. As used herein, "good adhesion to a contact lens or a silicon hydrogel contact lens" in reference to a colored coat or an ink means that the colored coat (with a color image) generated on the lens with the ink can pass a mechanical rubbing test, The mechanical rubbing test for assessments of ink adhesion. The mechanical rubbing test is made by evaluating test specimen cloths that are generated by placing a hydrated lens between layers of the cloth and applying a mechanical stress to the cloth. Two methods of applying mechanical stress are:
1) Compression of the cloth-lens assembly between two fixed rollers
2) Application of stress to the cloth-lens assembly using a commercially available devise designed for abrasive wear testing (Taber® Linear Abraser Model 5750, Taber Industries, Inc.)

Visible and microscopic (~10×) observation of colorant bleeding, smearing, or delamination indicates failure of the rub test.

In accordance with the invention, an ink can be applied to a molding surface of a mold according to any printing technologies, such as, for example, pad transfer printing (or pad printing), or inkjet printing. It is understood that other types of printing technologies could also be used to print molds.

In accordance with the present invention, a lens-forming fluid material can be a solution or a solvent-free liquid or melt at a temperature below 60° C.

In accordance with the present invention, a lens-forming fluid material can be any formulations for making soft contact lenses. Exemplary formulations include without limitation the formulation of lotrafilcon A, lotrafilcon B, genfilcon A, lenefilcon A, acquafilcon A, and balafilcon.

Where a lens-forming fluid material is a solution, it can be prepared by dissolving at least one silicone-containing vinylic monomer or macromer and at least one hydrophilic vinylic monomer and all other desired components in any suitable solvent known to a person skilled in the art, for example, including those described above.

In accordance with the present invention, any know suitable silicone-containing macromer, such as, for example those disclosed above, can be used to prepare soft contact lenses. Any known suitable silicone-containing vinylic monomers, such as, for example, those described above, can be used to prepare soft contact lenses.

Examples of suitable hydrophilic monomers are those described above.

In accordance with the present invention, a lens-forming material can further comprise various components, such as cross-linking agents, hydrophobic vinylic monomers, initiator, UV-absorbers, inhibitors, fillers, visibility tinting agents, antimicrobial agents, and the like.

In accordance with the invention, at least one identifying mark coat is applied to at least a portion of at least one of the female molding surface or the male molding surface with an ink. The identifying mark coat can be applied to a molding surface of a mold according to any printing technologies, such as, for example, pad transfer printing (or pad printing), or inkjet printing. It is understood that other types of printing technologies could also be used to print molds.

For colored identifying mark coat, the ink comprises at least one colorant and a silicone-containing polymer binder. The colored indicator can be optimized utilizing both sides of the lens with different prints on the base curve (BC) and front curve (FC) with different prints on the FC and BC molds. This two sided approach option provides additional degrees of freedom to the design space for the identifying mark. The combination of color and spatial patterns will aid the user when their vision is uncorrected (i.e. when they are not wearing lens) making the indicator mark (such as inversion indicator) more obvious and easier to use. Current indicator marks rely on spatial patterns which may produce some contrast difference, at best, when viewed from one side or the other. There is confusion in the market place as to what constitutes the intended pattern to recognize i.e. should the phrase be legible when viewed from the BC or FC side of the lens. In this invention, identifying marks can also mean indicator marks.

Identifying marks could be a wear indicator. The consumer could use this wear indicator mark as a gauge of lens use, such as indication of age out of package, age left in the eye, or actual wear from mechanical abrasion from the eye. A controlled release substance can either elute out of the lens, mechanically abraded from the surface, or released through degradation processes. A control release substance can be mixed into ink and printed onto the lens or onto the mold of the lens to form a graphical object, number, or letter. This printed controlled release substance and the ink binder can either be colored or clear.

The controlled release substance could be composed of a low molecular-weight compound (i.e. 16-100 KD Mw). This macromolecule is opaque or semi-opaque because of its ability to form large aggregates with the bulk polymer system. The macromolecule can either elute, gyrate, or diffuse out of the bulk polymer with age or mechanical wear. As the concentration of the macromolecule decreases, the opacity is reduced, and the wear indicator slowly fades.

For clear identifying mark coat, the ink may comprise a silicone-containing polymer binder and material has a different refractive index provided the ink contains no color pigments or dye. Indicator marks for lens orientation in the case of toric or other asymmetric optics are currently scribed directly on the lens in the case of a conventional lens. Other ways of adding a rotation mark are by printing (pad printing or ink jet printing) a colored ink directly onto the lens or on the mold. The addition of a colored indicator mark adds the challenge of having the mark be dark enough to be visible for the eye care professional during fitting, but light enough that it is not visible when the lens is worn, especially by light eyed people. However, the indicator mark can be made of clear ink that becomes visible under certain lighting conditions (e.g. slit lamp) without being visible under normal light conditions so that the consumer will not notice it, but the eye care professional can still see it for fitting purposes. The ink can be made of a material that has a different refractive index. The interface between the bulk lens and the ink mark can provide a scattering surface under the proper lighting conditions. For example from the lighting at a grazing angle which is possible with a slit lamp.

For clear identifying mark coat, the ink can also comprise a silicone-containing polymer binder and invisible fluorescent paints. The invisible fluorescent paints appear transparent under daytime lighting, but will glow only under UV light- and in a limited range of colors. Since these can seem to 'disappear', they can be used to create a variety of clever effects. The invisible fluorescent paints can be made by mixing clear ink (the same ink disclosed in the present invention without color pigments or dyes) with fluorescent powder, such as commercially available from GloNation. A UV fluorescent identifying mark which is not visible in normal light, yet fluoresces under UV light would eliminate the comfort issue and the unobtrusive requirement and permit these marks to be designed for maximum effectiveness for the eye practitioner.

In pad-transfer printing, an identifying mark image is placed or printed on a pad transfer device and the image on the pad transfer device is transferred to another surface, such as a polymer or lens (U.S. Pat. No. 3,536,386 to Spivack; U.S. Pat. Nos. 4,582,402 and 4,704,017 to Knapp; U.S. Pat. No. 5,034,166 to Rawlings et al., herein incorporated by reference in their entireties). A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts a contact lens or a mold. Appropriate pad-transfer printing structures include, but are not limited to, Tampo-type printing structures (Tampo vario 90/130), rubber stamps, thimbles, doctor's blade, direct printing, or transfer printing as they are known in the art.

In accordance with the invention, the identifying mark coat on the molding surface is irradiated with a first high intensity UV light to at least partially cure the identifying mark coat. In accordance with the present invention, the first intensity UV light has a relatively high intensity of UVA/UVB to provide energy for initiation of free radical reactions through the printed identifying mark pattern. For example, the first UV illumination is accomplished by using a high intensity lamp system with a D bulb, such as a Fusion Systems Inc. model F300 with a model T300MB irradiator and a D UV source or a Fusion Systems Inc. model VPS6 with a model 1250 irradiator and a D bulb UV source.

In still another embodiment, the UV intensity of the first high intensity UV light may have approximate values of about 20-60 mW/cm$^2$, more preferred range of 35-40 mW/cm$^2$ at a wavelength range of about 250-260 nm. At a wavelength range of about 320-390 nm, the UV intensity may have approximate values of about 500-1250 mW/cm$^2$, more preferred range is 600-800 mW/cm$^2$, even more preferred range is 650-750 mW/cm$^2$. The irradiation step uses the first high intensity UV light with an exposure time on the order of 1.0-25 second(s). More preferably, the exposure time is contemplated to last 2.0-10.0 second(s). More preferably still, the exposure time is contemplated to last 3.0-5.0 second(s). For the first high intensity UV light irradiation, at a wavelength range of about 320-390 nm, the UV energy applied may have approximate values of about 300-800 mJ/cm$^2$, more preferred range is 400-700 mJ/cm$^2$, and even more preferred range is 550 to 650 mJ/cm$^2$ using the F300 system.

In accordance with the present invention, a possible setup of the system for the first high intensity UV light is shown in US2008/0150178 A1, which is incorporation herein by reference in its entirety.

In accordance with the present invention, characterization and monitoring of the UV source and optical system requires radiometric measurements. Radiometers appropriate to the high intensities described in this disclosure may include the EIT Inc model UV PowerMAP™ four channel radiometer in the high power configuration or the EIT Inc. model 3DCURE™ radiometer system with the high sampling rate option.

In accordance with the present invention, contact lenses may be produced by double-sided molding (DSM) processes. These processes typically involve dispensing a fluid material into a female mold half, mating a male mold half to the female, and exposing the mold assembly and the lens-forming fluid material to an energy source, wherein the energy source polymerizes the lens-forming fluid material. The energy source could be ultraviolet radiation to polymerize the monomers. For example exposed to UV light at a wavelength range of about 320-390 nm, the UV intensity applied may have approximate values of about 4-8 mW/cm$^2$ for 5-7 minutes. Such molds may be injection molded or produced in any other feasible way known in the art. The female mold half may have a molding surface with optical quality that defines the anterior (front) surface of a contact lens. The male mold half may have a molding surface with optical quality that defines the posterior (back) surface of the lens. The polymerized lens removed from the molds in a DSM process does not usually require surface polishing, but subsequent extraction of unreacted monomer or solvent is commonly required.

An improvement of the DSM process is described in U.S. Pat. No. 6,113,817. This improvement may be semi-cyclic and preferably includes the steps of (a) dispensing crosslinkable and/or polymerizable material into a female mold half, (b) mating a male mold half to a female mold half to create a lens cavity; (c) applying radiation to crosslink and/or polymerize the crosslinkable and/or polymerizable material to form a lens; (d) separating the male mold half from the female mold half; (e) washing the mold halves and lens to remove unreacted crosslinkable and/or polymerizable material; (f) ensuring the lens is adjacent a selected mold half (e.g., the female mold half); (g) centering the lens within the selected mold half; (h) grasping the lens (e.g., in a central area) to remove the lens from the mold half; (i) at least partially drying the lens to remove surface water which may impair inspection of the lens; (j) inspecting the lens; (k) depositing an acceptable lens into packaging; (l) cleaning the male and female mold halves; and (m) indexing the male and female mold halves to a position for dispensing crosslinkable and/or polymerizable material. This semi-continuous, partially cyclic molding process reuses or recycles the mold halves used to retain the fluid optical material and give the lens its shape.

The semi-continuous, partially cyclic molding process may be operated with a single mold cycling through the process or a plurality of molds arranged and aligned in a molding carrier in order to improve process efficiency. The molds may include disposable molds, such as polypropylene molds or quartz and brass molds that are reused. The mold halves may be formed from a number of materials, at least one of which transmits the desired radiation for crosslinking and/or polymerization, preferably in the ultraviolet range. Examples of contemplated suitable mold materials include polypropylene, PMMA, polycarbonate, Zenex, Zenor, OPI Resin by Hitachi, TOPAS®, polystyrene, polypropylene and poly(acrylonitriles) such as BAREX. Molds are typically used in the manufacturing process immediately after they are created to achieve optimal performance; however, in some cases immediate use is not possible due to manufacturing constraints. The temperature and conditions of these molds is important as the mold shapes the final lens. Defects in the mold may propogate, causing defects in the lenses.

In some manufacturing techniques, molds may be created off-line by injection molding. Front curve and back curve molds may be produced simultaneously or in parallel tracks to produce front curve and back curve molds of essentially the same age. In some embodiments, these molds may be stacked in paired units. In an embodiment in which paired units are utilized, the molds may be used in a last-in, first-out method, which means that the molds may not be used immediately and that some molds may be exposed to ambient air for extended periods of time.

If prior to assembly, the mold halves are exposed to oxygen, the polymerization process may be inhibited to such an extent that the contact lenses will not have the desired physical properties. It is suspected that this is due to the $O_2$ being adsorbed onto and absorbed into the plastic mold halves, which may adversely affect the polymerization of the lens material. The effect of $O_2$ on the photopolymerization process is that it strongly inhibits radical-induced polymerization. Polymerization is suppressed until $O_2$ has been consumed by reaction with radicals until the monomer or macromer is able to compete successfully with $O_2$ for initiator radicals. Exposing mold halves to $O_2$ before assembly of the mold halves leads to a "closed-open" system during polymerization. When the system is open, $O_2$ absorbs onto the surface and absorbs into the mold, thus creating an $O_2$ reservoir. When the mold is assembled (closed), after the induction period when $O_2$ in the monomer and on and in the mold halves is consumed, polymerization proceeds in the lens bulk. The effect on lens properties is dependent on the amount of $O_2$ absorbed into the mold prior to assembly.

The effect of $O_2$ absorbed onto and into the mold on photopolymerization of the reaction mixture is expected to disrupt polymerization at the lens surface, i.e. to cause differential polymerization at the lens surface relative to the lens bulk. This disruption causes more loose polymer ends at the surface due to (premature) termination of polymerization by $O_2$. These shorter chain polymers at the surface of the lens tend to have lower cross link density, less chain entanglement, and more tackiness than the polymer chains in the bulk of the lens. These factors result in a material property gradient from the lens surface to the lens bulk.

To reduce the deleterious effect of $O_2$, contact lens manufacture may be carried out in a reduced $O_2$ environment, and/or the reaction mixture is treated to remove dissolved $O_2$ prior to polymerization. In manufacturing, this has resulted in the use of techniques such as physical enclosure of the process and use of large quantities of nitrogen to blanket the assembly and pre-assembly areas. This technique includes the plastic mold halves within the blanketed area since the boundary layer of gases on the plastic surfaces will include $O_2$ if not so protected. Typically, the percent $O_2$ in the atmosphere surrounding the plastic molds halves is monitored and kept below 0.5 percent, the other 99.5 percent of the atmosphere is the inert gas. For example, see U.S. Pat. No. 5,555,504.

The prior art discloses that the amount of oxygen exposure must be limited or avoided to prevent the deleterious effects that the exposure to oxygen has on the manufacture of contact lenses. Various techniques for reducing the deleterious effects of $O_2$ on the polymerization of contact lenses are found in the following U.S. Pat. No. 5,362,767 Herbrechtmeier, et al U.S. Pat. No. 5,391,589 Kiguchi, et al U.S. Pat. No. 5,597,519 Martin, et al U.S. Pat. No. 5,656,210 Hill, et al U.S. Pat. No. 5,681,510 Valint, Jr., et al. EP Appln. No. 95937446.3 discloses a process in which plastic molds are treated prior to dosing with the reactive monomer mix to remove substantially all of the $O_2$. The removal of the $O_2$ can be accomplished by contacting the mold pieces with an inert gas or by using a vacuum. Molds that were not treated to remove the $O_2$ provided contact lenses with high percentages of defects.

The present invention provides a method to counteract the adverse effects of oxygen exposure by decoupling the mold creation process from the polymerization of color lenses. This decoupling will allow greater flexibility in when the molds are manufactured and used in relation to the polymerization process.

In one embodiment of the present invention, this is accomplished by exposing both male and female molds to the second high intensity UV light immediately prior to the polymerization process of the lens. However, in order to obtain a high-quality color print image on the lens, the time between the mold exposing to the second high intensity UV light and ink printing on the mold/at least partially curing with the first high intensity UV light preferred occurs between 0.5 to 96 hours, preferably between 18 to 48 hours, more preferably between 20 to 26 hours.

In accordance with the present invention, the second high intensity UV illumination has a relatively high intensity of UVC is to provide the energy at the surface for the reactions that lead to the enhancement of final lens ion permeability. For example, the second high intensity UV illumination is accomplished by using a high intensity lamp system with an H+ bulb, such as a Fusion Systems Inc. model F300 with a model T300MB irradiator and an H+ UV source or a Fusion Systems Inc. model VPS6 with a model I250 irradiator and an H+ UV source.

The second high intensity UV may have approximate intensity values of about 150-600 mW/cm$^2$, more preferred range about 240-480 mW/cm$^2$ at a wavelength range of about 320-390 nm. At a wavelength range of about 250-260 nm, the second high intensity UV may have approximate intensity values of about 45-125 mW/cm$^2$, more preferred range is 52 to 95 mW/cm$^2$. The irradiation step uses the second high intensity UV light with an exposure time on the order of 0.1-20 second(s). More preferably, the exposure time is contemplated to last 0.5-10 second(s). More preferably still, the exposure time is contemplated to last 1.0-5.0 second(s). Most preferably, the exposure time is contemplated to last 1.0-2.0 second (s). For the second high intensity UV irradiation, at a wavelength range of about 250-260 nm, the UV energy applied may have approximate values of about 15-100 mJ/cm$^2$, more preferred range is 20-85 mJ/cm$^2$, and even more preferred range is 25 to 75 mJ/cm$^2$ using the F300 system.

In accordance with the present invention, emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

In accordance with the present invention, a possible setup of the system for the second high intensity UV light is shown in US2008/0150178 A1, which is incorporation herein by reference in its entirety.

In accordance with the present invention, characterization and monitoring of the UV source and optical system requires radiometric measurements. Radiometers appropriate to the high intensities described in this disclosure may include the EIT Inc model UV PowerMAP™ four channel radiometer in the high power configuration or the EIT Inc. model 3DCURE™ radiometer system with the high sampling rate option.

In accordance with the present invention, a lens-forming fluid material comprising at least one silicone-containing vinylic monomer or macromer and at least one hydrophilic vinylic monomer is filled into the irradiated mold assembly from step d), and then curing of a lens-forming material can be initiated with an energy source (thermally or actinically). For example a lens-forming material is exposed to UV light at a wavelength range of about 320-390 nm, the UV intensity applied may have approximate values of about 4-8 mW/cm$^2$ for 5-7 minutes. After curing, lenses are demolded, extracted in isopropanol for 1 hour, and then re-equilibrated in phosphate buffered saline (PBS).

The above describes the way to manufacture a silicone-hydrogel contact lenses high ion permeability with irradiating the exposed surfaces of the female mold and the male mold with a second high intensity UV light prior to fill a lens-forming fluid material comprising at least one silicone-containing vinylic monomer or macromer and at least one hydrophilic vinylic monomer into the irradiated mold assembly. There is a new challenge to manufacture silicone-hydrogel contact lenses high ion permeability and a high-quality colored identifying mark image.

In accordance with the present invention, a high-quality colored identifying mark image refers to the colored identifying mark image has good adhesion to a contact lens or a silicon hydrogel contact lens and the colored identifying mark image has no smudging, no smearing and no delamination.

In accordance with the present invention, a high-quality clear identifying mark image refers to the clear identifying mark image has good adhesion to a contact lens or a silicon hydrogel contact lens. The quality of clear identifying mark image can use the same method for testing the quality of colored identifying mark image by adding some color dyes into the clear coating ink for testing purpose and for determining best curing strategy.

Smudging refers to deterioration in print quality due to loss of pattern shape and definition/crispness. The dots of the pattern starts loosing their round shape and the inks bleed into the lens formulation. It is a sign of under-cured inks Smearing refers to deterioration in print quality due to shearing of lens formulation on cured inks during the closing of the two molds halves. The print pattern looks like has been treated with a brush. It is a sign of under-cured ink.

Deterioration in print quality refers to that ink dots lose their shape and merge into each other resulting in a more intense color and in a "tile" pattern. It is a sign of over-cured ink.

The present invention discovers that using only one high intensity UV exposure (the H$^+$ bulb) resulted in colored identifying mark coat not completely cured and a final print quality non acceptable. The results indicate that the above method of making silicone hydrogel contact lenses will not result in a high-quality colored identifying mark image.

The above method fails because the colored identifying mark coat is not cured enough, when the molds are filled with lens-forming fluid material, the latest penetrated into the colored identifying mark coat layers and spread them over the mold, losing the pattern definition (smearing and smudging). This happens because the colored identifying mark coat network is too soft being undercured.

The present invention also discovers that using two same high intensity UV of 250-260 nm (the H$^+$ bulb) exposures resulted in colored identifying mark coat overcured and a final print quality non acceptable.

The above method fails because the colored identifying mark coat is overcured, the colored identifying mark coat becomes too rigid and the ink dots delaminate when the lens-forming material is added and lens is cure. Delamination looks like the colored identifying mark coat platelets floating on top of the lens.

The present invention further discovers that using two same high intensity UV of 320-390 nm (the D bulb) exposures resulted in contact lens with colored identifying mark having a non-acceptable ion permeability.

The above method fails because D bulb delivers not enough UV intensity in the wavelength from 250-260 nm to destroy the surface inhibited layer on the mold in order to enhance ion permeability.

The present invention further discovers that using two different high intensity UV exposures [the D$^+$ bulb having high intensity UV of 320-390 nm for curing the colored identifying mark coat and H$^+$ bulb having high intensity UV 250-260 nm for irradiating the exposed surfaces of the female mold and the male mold] result in a final print quality acceptable and high ion permeability.

The results indicate that the following method of making silicone hydrogel contact lenses will result in a high-quality identifying mark coat image. The method of making silicone-hydrogel contact lenses comprises the steps of:

(a) providing a mold assembly comprising a female mold half having a molding surface and a male mold half having a molding surface;

(b) applying at least one identifying mark coat to at least a portion of at least one of the female molding surface and the male molding surface with an ink, wherein the ink comprises a silicone-containing polymer binder;

(c) irradiating the identifying mark coat on the molding surface with a first high intensity UV light to at least partially cure the identifying mark coat;

(d) irradiating the exposed surfaces of the female mold and the male mold with a second high intensity UV light prior to;

(e) filling a lens-forming fluid material comprising at least one silicone-containing vinylic monomer or macromer and at least one hydrophilic vinylic monomer into the irradiated mold assembly from step d);

(f) exposing the mold assembly and the lens-forming fluid material to an energy source, wherein the energy source polymerizes the lens-forming fluid material;

wherein emission spectrum of the first high intensity UV light has a higher intensity in wavelength range 320-390 nm by at least 200 mW/cm$^2$ and a lower intensity in wavelength range 250-260 nm by at least 10 mW/cm$^2$ than the second high intensity UV light.

The above method works because the D bulb has low level of UVC. UVC exposure can lead to undesired free radical reactions and they can cause damage to the chemical structure of the coating binder contained in the identifying mark coat and break chemical bonds. The right combination of D bulb exposure and H$^+$ bulb exposure allows a lens that maintains good ion permeability (IP) value and an optimal print quality.

The previous disclosure will enable one having ordinary skill in the art to practice the invention. In order to better enable the reader to understand specific embodiments and the advantages thereof, reference to the following examples is suggested. The percentages in the formulations are based on weight percentages unless otherwise specified.

Example 1

This example describes synthesis of a photo-curable binder polymer

TABLE 1

| Components | Formulation (% by weight) |
|---|---|
| DMA | 38.53 |
| VAZO-52 | 0.60 |
| TRIS-methacrylate | 24.49 |
| Betacon macromer | 21.47 |
| HEMA | 10.10 |
| 2-mercaptoethanol | 1.38 |
| IEM | 3.43 |

IEM = 2-isocyanatoethylmethacrylate

Two-step binder synthesis is described as below:
Step 1—copolymerization
All reactants (minus IEM) area reacted together at 50° for 24 hours in ethyl acetate; 2-mercaptoethanol controls the viscosity build up.
4-hydroxy TEMPO is added at 100 ppm to scavenge any radicals created in the remaining synthetic process.
Step 2—Functionalization to Macromer
IEM and catalyst (dibutyltin dilaurate) are added to functionalize the copolymer; this reaction is at 40° for 4 hours.
Finishing
The product is solvent exchanged to 1-propanol by evaporating off ethyl acetate.
Macromer ("binder polymer") is then incorporated into ink formulation.

Example 2

This example describes preparation of an ink formulation

| Components | Formulation (% by weight) |
|---|---|
| Binder from example 1 | 38 |
| Darocure 4265 | 2.0 |
| pigments | Varies by colors/5-10% |
| Solvent/ethanol | To 100 |

Base curve portion (male mold halves) of polypropylene molds are pad printed with a combination of three inks (three patterns, one different color per pattern, same ink formulation, different only for type and quantity of pigments). The printed mold is exposed to first high intensity UV (Fusion D bulb) for about 4 second.

Both male mold and female mold are exposed to second high intensity UV (Fusion H+ bulb) for about 1.5 second. There is a 24 hours time delay between the first high intensity UV treatment and second high intensity UV treatment.

The front curve portion (male mold halves) is then filled with about 75 microliters of lotrafilcon B formulation. The mold halves (printed/cured male and filled female) are combined and closed. The molds are then placed under UV lamp (double side) for about 6 minutes at 4-8 mW/cm$^2$. After curing, lenses are demolded, extracted in isopropanol for 1 hour, and then re-equilibrated in Phosphate buffered saline (PBS). Print quality smearing/smudging/delamination) is evaluated at high magnification. Lens with presence of smearing or smudging or delamination are considered not cosmetically acceptable. The resulted lens has an ion permeability of 5.5-6×10$^{-6}$ mm$^2$/min.

The invention has been described in detail, with particular reference to certain preferred embodiments, in order to enable the reader to practice the invention without undue experimentation. A person having ordinary skill in the art will readily recognize that many of the previous components, compositions, and/or parameters may be varied or modified to a reasonable extent without departing from the scope and spirit of the invention. Furthermore, titles, headings, example materials or the like are provided to enhance the reader's comprehension of this document, and should not be read as limiting the scope of the present invention. Accordingly, the invention is defined by the following claims, and reasonable extensions and equivalents thereof.

What is claimed is:

1. A method of making silicone-hydrogel contact lenses, comprising the step of:

(a) providing a mold assembly comprising a female mold half having a molding surface and a male mold half having a molding surface;

(b) applying at least one identifying mark coat to at least a portion of at least one of the female molding surface and the male molding surface with an ink, wherein the ink comprises a silicone-containing polymer binder;

(c) irradiating the identifying mark coat on the molding surface with a first high intensity UV light to at least partially cure the identifying mark coat;

(d) irradiating the molding surfaces of the female mold and the male mold with a second high intensity UV light prior to step e);

(e) filling a lens-forming fluid material comprising at least one silicone-containing vinylic monomer or macromer and at least one hydrophilic vinylic monomer into the irradiated mold assembly from step d);

(f) exposing the mold assembly and the lens-forming fluid material to an energy source, wherein the energy source polymerizes the lens-forming fluid material; wherein emission spectrum of the first high intensity UV light has a higher intensity in wavelength range 320-390 nm by at least 200 mW/cm2 and a lower intensity in wavelength range 250-260 nm by at least 10 mW/cm2 than the second high intensity UV light.

2. The method of claim 1, wherein the identifying mark coat is a clear identifying mark coat.

3. The method of claim 2, wherein the identifying mark coat comprising invisible fluorescent dyes, or pigments.

4. The method of claim 2, wherein the identifying mark coat comprising a material has a different refractive index from the polymerized lens-forming material.

5. The method of claim 2, wherein the identifying mark coat comprising a controlled release substance.

6. The method of claim 1, wherein the intensity of the second high intensity UV light is about 150-600 mW/cm$^2$ at a wavelength range of about 320-390 nm, and about 45-125 mW/cm$^2$ at a wavelength of about 250-260 nm.

7. The method of claim 6, wherein in step (d) the second high intensity UV light irradiates for about from 0.1 to 20 seconds.

8. The method of claim 7, wherein in step (d) the second high intensity UV light irradiates for about from 0.5 to 5 seconds.

9. The method of claim 1, wherein in step (c) the first high intensity UV light irradiates for about from 1 to 25 seconds.

10. The method of claim 9, wherein in step (c) the first high intensity UV light irradiates for about from 2 to 10 seconds.

11. The method of claim 1, wherein the energy of the first high intensity UV light is about 300-800 mJ/cm$^2$ at a wavelength range of about 320-390 nm.

12. The method of claim 11, wherein the energy of the second high intensity UV light is about 15-100 mJ/cm$^2$ at a wavelength range of about 250-260 nm.

13. The method of claim 1, wherein the intensity of the first high intensity UV light is about 650-750 mW/cm$^2$ at a wavelength range of about 320-390 nm, and about 35-45 mW/cm$^2$ at a wavelength of about 250-260 nm.

14. The method of claim 1, wherein the identifying mark coat is a colored identifying mark coat.

* * * * *